Patented Apr. 29, 1930

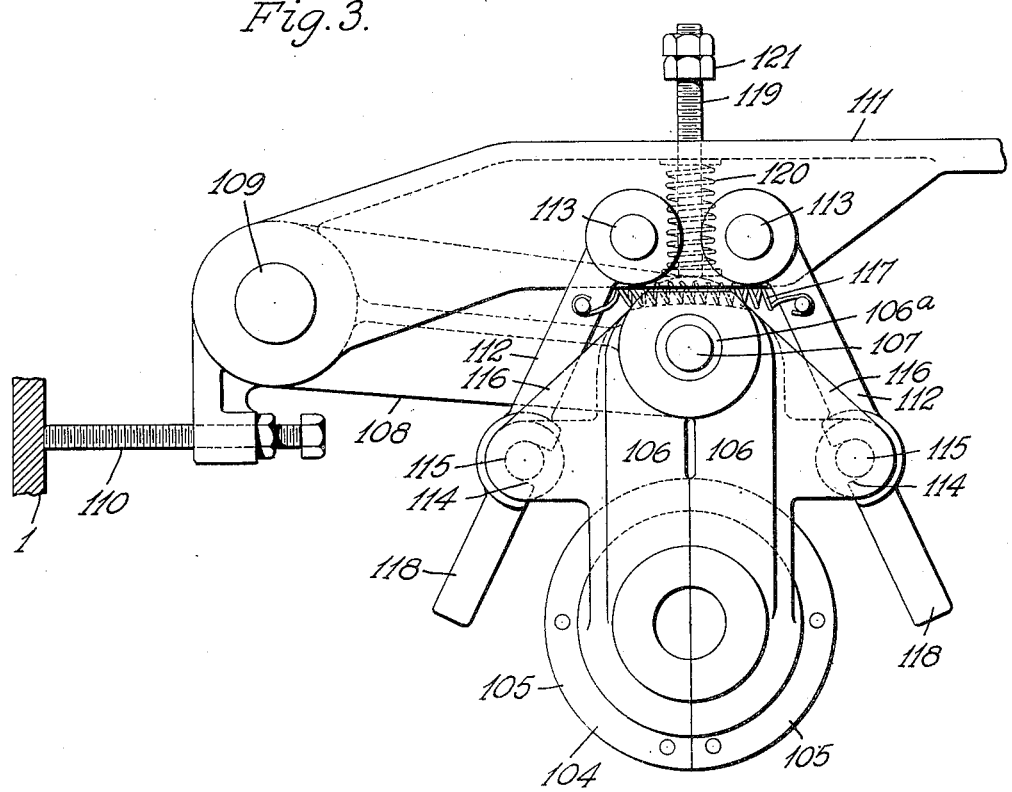

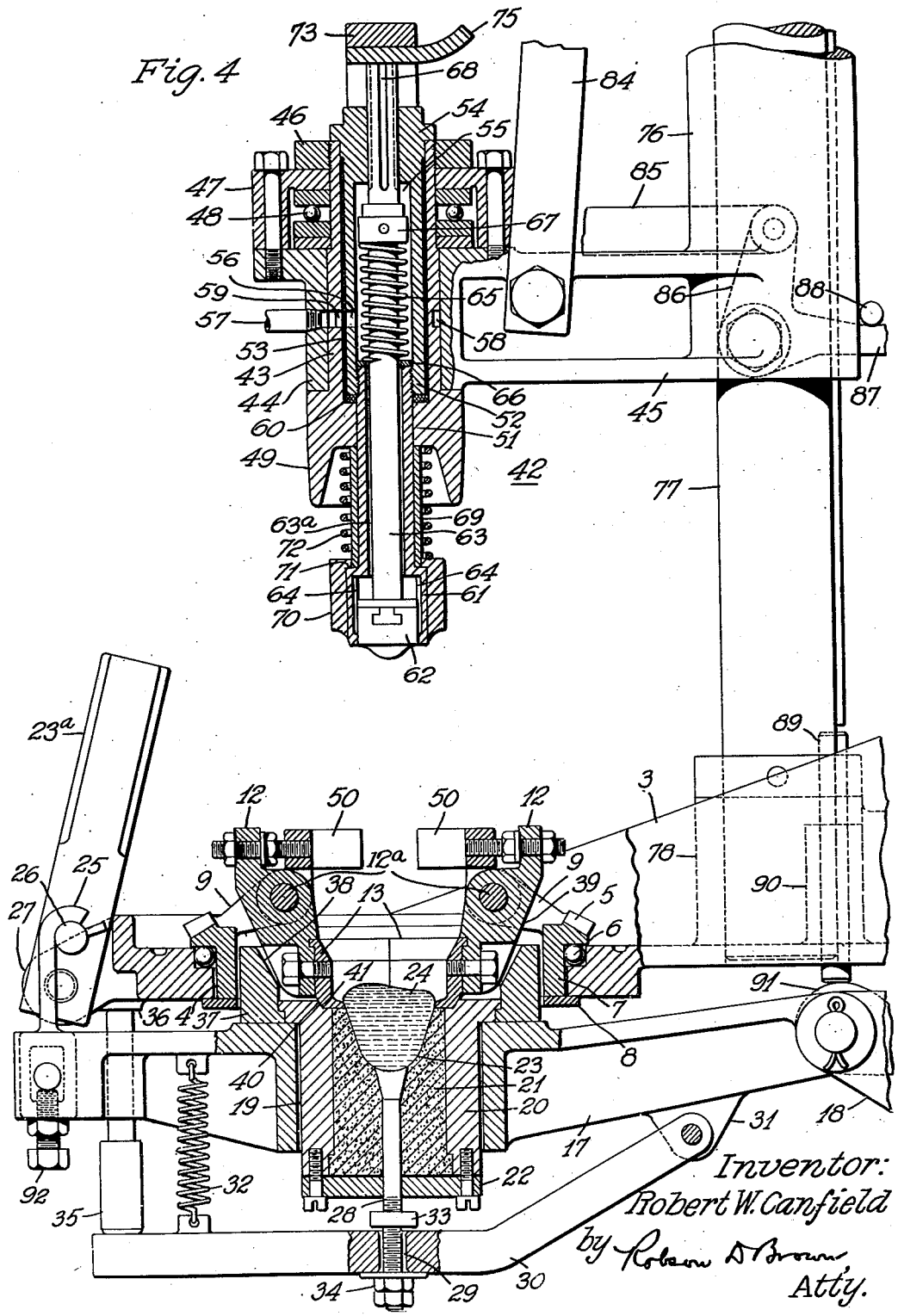

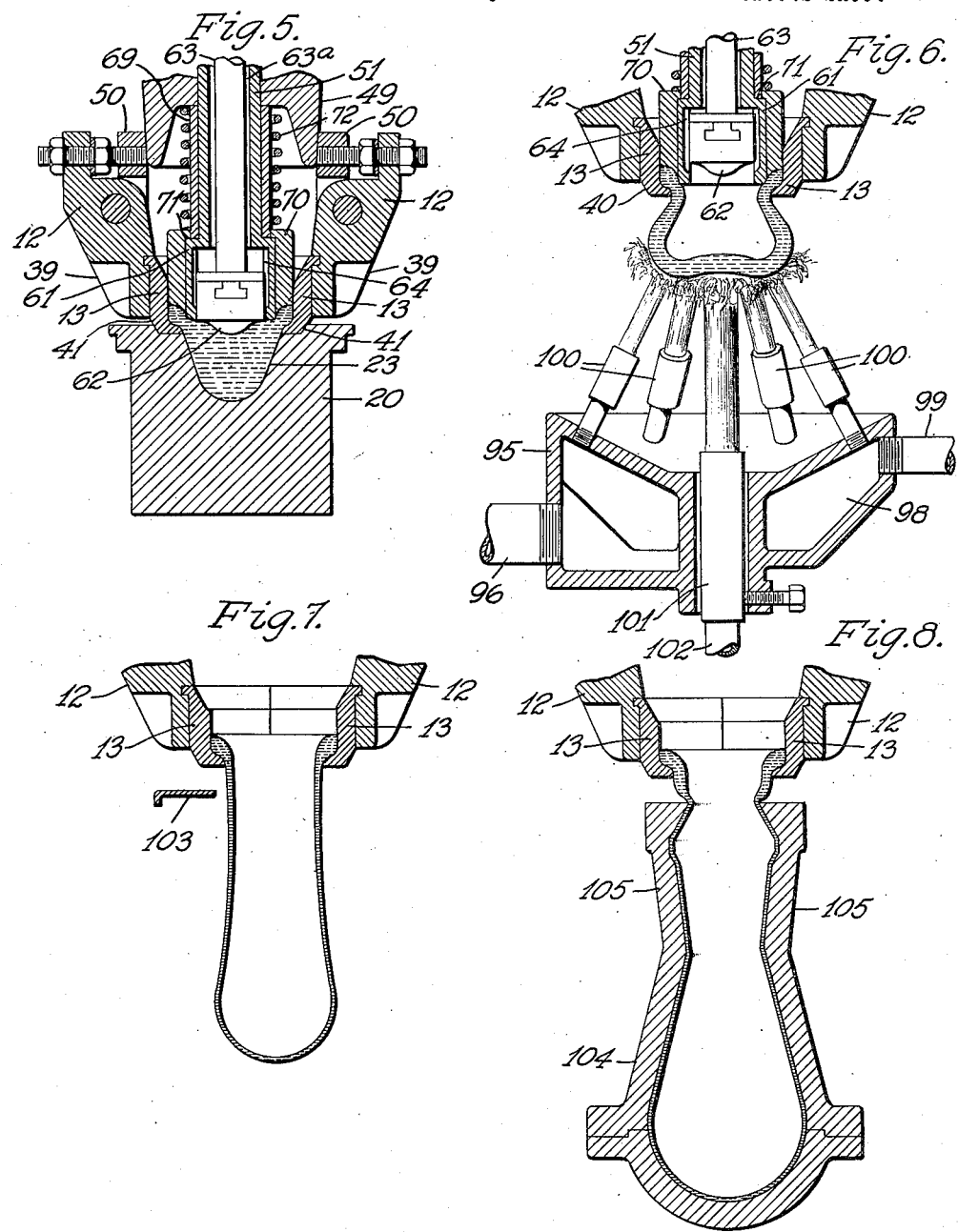

1,756,813

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR MAKING HOLLOW BLOWN GLASSWARE

Application filed May 19, 1925. Serial No. 31,315.

This invention relates to the art of making hollow blown glassware, and it has particular relation to the production of ware having relatively thin walls, such as lamp bulbs and tumblers.

One of the objects of the present invention is to provide a simple and effective method of making hollow glassware of the character described, including the steps of introducing a mold charge into a neck ring and blank mold; pressing the charge therein by a combined pressing plunger and blowhead to form a blank on parison; removing the blank mold; introducing blowing air from the blowhead to the blank and simultaneously applying a flame to the depending blank for reheating, shaping or supporting the blank, or for producing a combination of these effects; rotating the neck ring and blank during this stage; removing the burners to permit the partially blown blank to sag; closing a finishing mold about the depending blank, and introducing air from the blow head to blow the blank to final form.

Another object of the invention is to provide an apparatus, capable of performing the above-mentioned method, which is simple in construction, efficient in operation, and capable of greater production than apparatus heretofore employed.

In the accompanying drawings,

Fig. 3 is a plan view of the finishing mold and the mechanism for opening and closing the same;

Fig. 4 is an enlarged vertical sectional view of a portion of the machine showing the combined pressing plunger and blowhead and the neck ring and blank mold in operative position;

Fig. 5 is a fragmentary sectional view showing a mold-charge pressed in the blank mold by the plunger;

Fig. 6 is a fragmentary sectional view showing the blank being supported by the flame of the burner during the preliminary blowing operation;

Fig. 7 is a view showing the blank being permitted to sag and elongate at the completion of the preliminary blowing stage, and subsequent to the necking-in operation; and Fig. 8 is a view showing the completely blown ware in the finishing mold.

Figure 1:
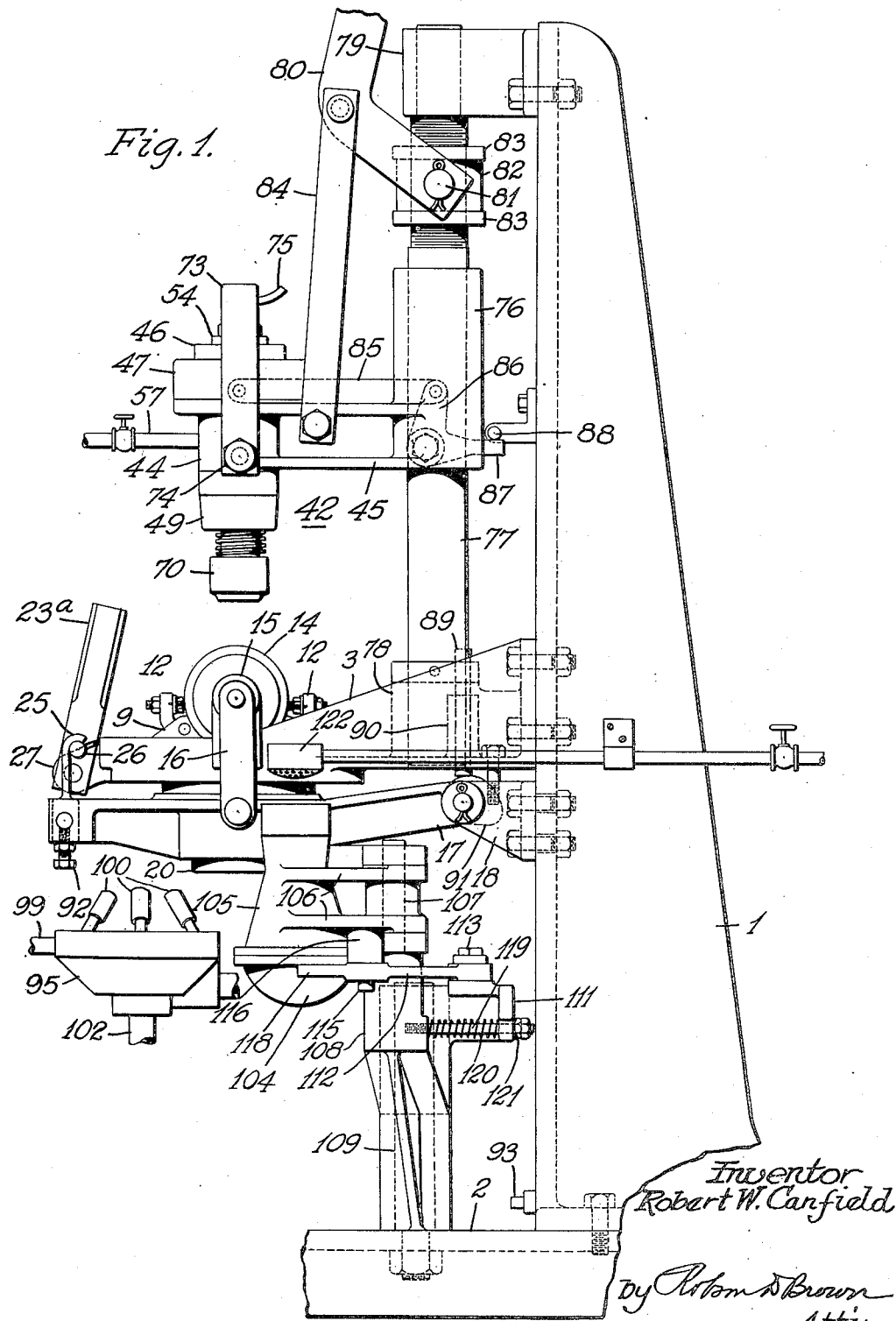
Figure 1 is a side elevation of a glass-working apparatus constructed in accordance with the present invention.
Figure 2:
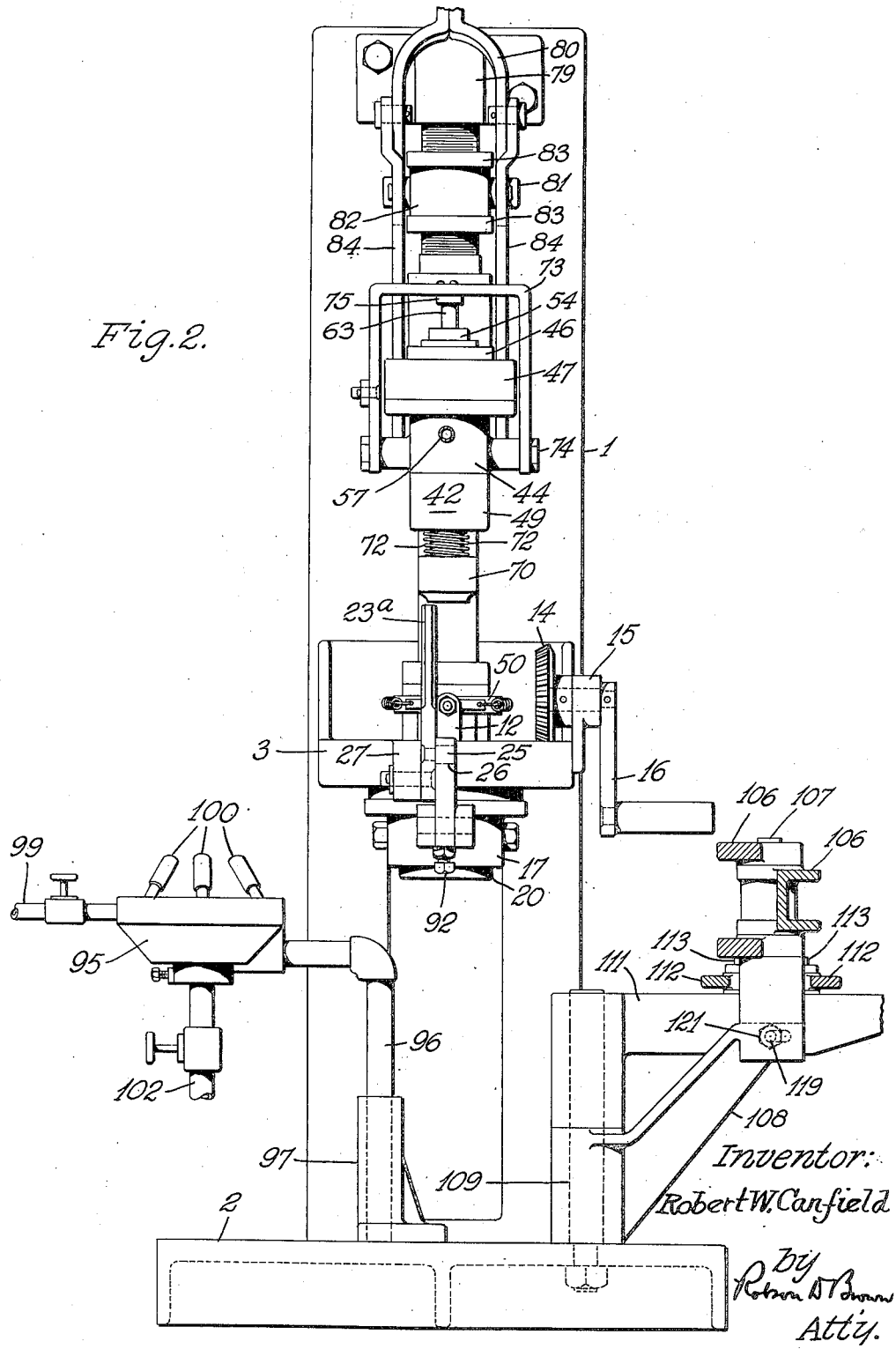
Fig. 2 is a front elevation of the structure shown in Fig. 1.

Referring to the drawings:

An apparatus embodying the present invention is shown as comprising a standard or pedestal 1 which is mounted upon a suitable base 2. A forwardly extending bracket or table 3 is secured to the standard 1 at the desired working level and is provided with a circular opening 4 (Fig. 4). A beveled ring gear 5 is rotatably mounted concentric with the opening 4 on ball bearings 6 and is provided with a hub portion 7 which projects into the opening 4, thereby maintaining the gear centrally located. Vertical displacement of the gear 5 is prevented by an annular flange 8 which is secured to the hub 7 for engagement beneath the table 3. The gear 5 is also provided with two diametrically disposed pairs of inwardly extending ears 9 which pivotally support neck ring holders 12, to each of which one-half or section 13 of a neck ring is detachably secured. The gear 5 and the neck ring carried thereby are rotated to spin the blank during the blowing and necking-in operations, presently to be described, by means of a bevel gear 14 (Fig. 2). This gear is journaled in a bearing 15 carried by the table 3 for intermeshing engagement with the gear 5, and is provided with an operating crank handle 16 or other suitable driving connection.

An arm 17 (Fig. 4) is pivotally mounted for vertical swinging movement on a bracket 18 carried by the column 1 and is provided with an annular opening 19 intermediate its length within which a blank mold 20 is seated for registry with the neck ring 13. The mold 20 may be provided, if desired, with a replaceable carbon insert 21, which is secured therein by a plate 22 and which is formed with a mold cavity 23 of the desired shape, adapted to receive a mold charge 24 of the required size from an automatic glass feeder or any other suitable source of supply, this construction being similar to that disclosed in my Patent No. 1,625,590, granted April 19, 1927.

The arm 17 is releasably secured in its upper position with the mold 20 in cooperative relation with the sections 13 of the neck ring, by means of an upwardly extending hook 25 which is carried by the forward end of the arm 17 and which engages a pin 26 provided on a lever 23ª. The hook 25 may be adjusted vertically by a screw 92 in order that the hook will engage the pin 26 with the desired tension. The lever 23ª is pivotally mounted on an ear 27 formed on the forward end of the table 3 and, when occupying the position shown in Figs. 1 and 4, holds the pin 26 in an over-the-center position, thereby securely locking the arm 17 and mold 20 in their operative positions.

A push-up pin 28 may be slidably mounted in the bottom of the mold 20 and extends downwardly through an opening 29 provided in an arm 30. This arm is pivotally mounted at its rear end for vertical swinging movement between depending ears 31 formed on the arm 17 and is yieldably supported at its forward end by a coiled spring 32. Movement of the arm 30 is imparted to the pin 28 through stop nuts 33 and 34, which are adjustably threaded on the pin 28 above and below the arm 30. When the arm 17 occupies the position shown in Fig. 4, the pin 28 is maintained in its lowermost position against the action of the spring 32 by a stop pin 35 which is supported by the forward end of the arm 30 and which extends upwardly through an opening in the forward end of the arm 17 for abutting engagement with a stop 36 formed in the underside of the forward end of the table 3. When the arm 17 is released to remove the blank mold at the conclusion of the pressing operation, as will be presently described, the downward movement of the arm 30 and the pin 28 will be momentarily delayed relative to that of the arm 17 and the mold 20 through the action of the spring 32, with the result that the pressed blank is stripped or dislodged from the mold cavity 23 by the pin 28 in the event that it adheres therein.

The neck ring 13 is closed prior to the mold-charging operation by a ring 37 carried by the arm 17 and disposed concentric with the mold 20. This ring is provided with a beveled inner surface 38 which engages correspondingly beveled surfaces 39 on the neck ring holders 12 when the arm 17 is raised and swings the holders 12, together with the sections 13 of the neck ring carried thereby, about their pivots 12ª until the sections are nearly closed. A beveled or tapered lower edge 40 of the neck ring is then engaged by correspondingly beveled walls of a depression 41 provided in the upper surface of the mold 21, which forces the sections of the neck ring completely together and securely locks them in the operative position shown.

The mold charge is pressed in the blank mold 20 to form a parison of the desired shape by a combined pressing and blowing mechanism which is indicated as a whole at 42, and the construction of which is best shown in Fig. 4. This mechanism comprises a cylindrical barrel 43 which is rotatably mounted in a bearing 44 provided on the end of an arm 45 and is supported therein by a nut 46 which is threaded onto the upper end of the barrel 43 and which rides upon the upper surface of a housing 47. This housing is bolted to the arm 45 and contains a ball bearing structure 48 which takes the upward thrust of the parts during the pressing operation. The lower end of the barrel 43 is provided with a neck ring locking head 49 having a tapered outer surface which is adapted to enter between arcuate members 50 carried by the upper ends of the neck ring holders 12 and hold them apart, and the sections of the neck ring together, after the blank mold has been removed and during the blowing operation.

A tube 51 extends co-axially through the neck ring locking head 49 and is threaded into the lower end of a barrel 52. This barrel is mounted within the barrel 43 and in spaced relation therewith to provide an annular air space 53 therebetween. The upper end of the barrel 52 is closed by a head 54 to form an air chamber 55, which communicates with the annular air space 53 through a port 56. Fluid under pressure is supplied to the air space 53 from a pipe 57 which communicates with a peripheral groove 58 and port 59 formed in the barrel 43. The head 54 is seated upon the upper end of the barrel 43 and the lower end of the barrel 52 is seated upon a packing 60 disposed within the barrel 43. A cylindrical shell or enlargement 61 is provided on the lower extremity of the tube 51, within which a head 62 is slidably mounted. This head is detachably secured to a lower end of a stem 63 which extends upwardly through the tube 51 and through the chamber 55 and the head 54. The stem 63 is spaced from the sleeve 51 to form an air space 63ª which establishes communication between the chamber 55 and a plurality of grooves 64 formed in the inner surface of the upper portion of the shell 61. The contour of the lower portion of the shell 61 is, however, unbroken and forms a substantially glass-tight fit with the head 62 when the latter occupies its lowermost position, as shown in Figs. 4 and 5. However, when the head 62 occupies its uppermost position during the blowing operation, as shown in Fig. 6, air is free to pass downwardly from the chamber 55 through the sleeve 51 and grooves 64 and outwardly beneath the head 62.

The head 62 and stem 63 are supported within the sleeve 51 and barrel 52 by a spring 65 which surrounds the stem 63 within the chamber 55 and between a washer 66, which is seated on the end of the sleeve 51, and a collar 67, which is fixed to the stem 63. The upper end of the stem 63 is formed with a plurality of grooves 68 which establish communication between the chamber 55 and the outer atmosphere when the head 62 occupies its lowermost position.

The sleeve 51 and the barrel 52 are maintained against vertical displacement by a sleeve 69 which surrounds the lower portion of the sleeve 51 between the locking head 49 and the shell 61. A stripper ring 70 surrounds the shell 61 and is supported by an annular shoulder 71 which overhangs the upper edge of the shell 61. The stripper ring 70 is yieldably maintained in pressing position by a spring 72 which surrounds the sleeve 51 between the upper edge of the stripper ring and the lower face of the locking member 49. The spring 72 is sufficiently strong to cause the stripper ring to force the glass freely against the walls of the blank mold but will yield to allow excess glass to extrude upwardly between the neck ring and the shell 61.

The head 62 and its directly associated parts are maintained in the position shown in Figs. 4 and 5 by means of a yoke element 73 which is pivotally mounted on trunnions 74 carried by the bearing 44 (Fig. 1).

The upper or transverse portion of the yoke 73 is provided with a cam plate 75 which is adapted to engage over the upper extremity of the stem 63 and maintain the head 62 in the depressed position illustrated in Figs. 4 and 5 against the action of the spring 65.

The arm 45 which supports the combined pressing and blowing mechanism is provided at its rear end with a bearing sleeve 76 which is splined to a vertical post 77 for vertical sliding movement. This post is rotatably mounted at its lower end in a bearing 78 carried by the table 3 and at its upper end in a bearing block 79 mounted on the upper end of the pedestal 1. The arm 45, together with the mechanism carried thereby, is moved vertically and swung horizontally by means of a yoke lever 80 which is pivotally mounted upon trunnions 81 provided on a collar 82 carried by the post 77. This collar is maintained at the desired operating height by means of lock nuts 83 which are threaded on the post 77, above and below the collar 82. The lever 80 is connected to the arm 45 by means of a link 84 so that the arm and the parts carried thereby may be raised and lowered by vertically swinging the lever 80. The arm 45 may be swung horizontally by a corresponding movement of the lever 80 in order to move the pressing elements into and out of alignment with the mold 20.

A link 85 connects the yoke 73 to one arm 86 of a bell crank lever which is pivotally mounted on the slide bearing 76 and has another arm 87 which extends rearwardly for engagement beneath a stop 88 and above a pin 89 which is slidably mounted in a bearing 90 provided on the table 3 and is supported by a cam 91 provided on the rear end of the arm 17.

After the blank mold is charged with glass, the pressing operation is accomplished by first swinging the lever 80 horizontally to move the pressing mechanism into axial alignment with the blank mold and then downwardly to lower the pressing mechanism. As this mechanism descends, the pressing and blowing plunger consisting of the head 62, the shell 61 and the stripper ring 70, enters between the sections 13 of the neck ring and presses the mold charge in the blank mold. The downward travel of the pressing mechanism carries the neck ring locking member 49 into wedging contact between the arcuate members 50 and the bell crank lever arm 87 to a position directly above the pin 89. The locking member 49 also insures that the pressing mechanism is accurately centered with respect to the blank mold.

At the conclusion of the pressing operation the lever 23$^a$ is swung forwardly and downwardly, moving the pin 26 from its over-the-center position and disengaging the hook 25 therefrom. As soon as the hook 25 is thus released from the pin 26, the arm 17 and the parts carried thereby fall under the action of gravity, leaving the pressed blank suspended by its margin from the neck ring 13 which is maintained in position by the locking member 49 after the mold 20 is removed and which together with the shell 61 and stripper ring 70 provides a holder for the blank during the succeeding operations.

The descent of the arm 17 is arrested by the screw 92 engaging a yieldable abutment 93 carried at the lower end of the pedestal 1 of the machine (Fig. 1).

As the lever 17 swings downwardly, the cam 91 forces the pin 89 upwardly, which in turn forces the bell crank lever arm 87 upwardly, and the lever arm 86 together with the link 85 forwardly. The forward movement of the link 85 swings the yoke 73 forwardly and moves the cam plate 75 from engagement with the stem 63 of the pressing head 62, permitting these elements to be immediately lifted by the spring 65. The upward movement of the pressing head 62 and the stem 63 disestablishes fluid communication between the chamber 55 and the outer atmosphere through the grooves 68 in the upper portion of the stem 63, and at the same time establishes fluid communication between the air chamber 55 and the blank, through the space 63$^a$ and the grooves 64 in the shell 61. Suitable automatic or manual means may be provided to control the flow of air in the pipe 57, so that air will be supplied to the blow head at the desired time.

After the removal of the blank mold but prior to the application of blowing pressure, the operator may spin the blank at the desired speed through the medium of the crank 16, gear 14, and gear 5, and at the same time may apply additional heat to the blank in order to reheat the chilled outer surface thereof. Such heat is supplied in the present instance through the medium of a burner 95 (Figs. 2 and 6), which is mounted on a swinging support 96, journaled in a bearing 97 carried by the base 2 of the machine. This burner may comprise a chamber 98 which is supplied with gas or other fluid fuel through a pipe 99. One or more burner outlets, herein shown as a plurality of circularly arranged nozzles 100 communicate with the chamber 98 and extend upwardly therefrom and are adapted to project jets of flame at the desired angle against the blank in order to control the distribution of the glass while it is being blown. The burner is also provided with a centrally disposed nozzle 101 which is supplied with fuel independently of the burners 100 from a pipe 102. This burner not only augments the heat supplied by the burners 100, but exerts an upward gaseous pressure which tends to retard the sagging of the parison, so that the walls thereof will assume the desired thickness at an early stage of its formation. As soon as the parison is sufficiently reheated, blowing pressure is applied along with the continued application of heat. This is continued until the parison is of the desired shape and wall thickness, at which time the burner 95 is swung aside and the sagging of the parison is permitted to continue. During or before this stage, a necking tool 103 may be applied, if desired, to control the shape and diameter of the parison (Fig. 7).

At the conclusion of the above operation, the rotation of the parison is temporarily discontinued. The parison is allowed to sag still further during this stage until it reaches the proper length, at which time a blow mold 104 is closed about it, and the blowing of the parison is resumed, with or without rotation of the parison, until it reaches its final form.

The blow mold 104 may comprise two cooperating sections 105, each provided with a horizontal arm 106, both of these arms being hinged upon a sleeve 106ª (Fig. 3). The sleeve 106ª is detachably mounted upon a pin 107 carried by an arm 108 which is mounted for horizontal swinging movement upon a vertical shaft 109 fixed to the base 2 of the machine. An adjustable stop 110 is provided on the arm 108 for engagement with the pedestal 1 to insure that the swinging movement of the blow mold is arrested when the mold is in operative position beneath the neck ring 13.

The blow mold is opened and closed, and is also swung to and from operative position beneath the neck ring, by means of a lever 111, which is also pivotally mounted upon the shaft 109. Links 112 are pivotally connected to the lever 111 at 113, and are each formed with a notch 114 for detachable engagement with pins 115 carried by ears 116 formed on the arms 106 of the blow mold. A spring 117 yieldably connects the links 112 in order to maintain the notches 114 in engagement with the pins 115 under normal operating conditions. The links 112 are each formed with extensions 118, which function as handles, by means of which the notches 114 may be disengaged from the pins 115 against the action of the spring 117, permitting the sleeve 106ª and mold sections to be lifted off of the pin 107 for replacement.

A pin 119 is fixed on the arm 108 and extends loosely through an opening in the arm 111. A spring 120 surrounds the pin 119 between the arm 108 and the arm 111, and tends to hold apart these arms, together with the sections 105 of the blow mold, when in an inoperative position.

At the conclusion of the blank forming operation, the operator swings the lever 111 to the left, as viewed in Fig. 2, and in a clockwise direction, as viewed in Fig. 3. This movement of the lever 111 imparts a corresponding movement to the arm 108 and the blow mold 104 through the medium of the spring 120. As soon as the motion of the arm 108 is arrested by the stop 110 engaging pedestal 1, the bodily movement of the blow mold stops. Continued movement of the lever 111, however, compresses the spring 120 and causes the links 112 to close the sections of the mold about the parison, in the position shown in Fig. 3.

At the conclusion of the blowing operation, the operator swings the lever 111 in a counter-clockwise direction, as viewed in Fig. 3. During the first part of this movement, the spring 120 maintains the arm 108 and the hinge pin 107 stationary, so that the first movement imparted to the blow mold will be the opening of the sections 105 thereof by the links 112. As soon, however, as the sections 105 are opened sufficiently to clear the blown article, the lever 111 engages an adjustable stop 121 carried by the pin 119, and swings the arm 108 and the opened blow mold away from the blown article, leaving the latter suspended by the neck ring 13, which is still maintained closed by the locking member 49.

The lever 80 is then actuated to elevate the pressing and blowing mechanism from operative position relative to the blown article, which action removes the locking member 49 from engagement with the segments 50 and permits the sections of the neck ring to swing about their pivots and release the blown article.

The upward movement of the pressing and blowing mechanism is continued until the arm 87 of the bell crank lever 86ᵃ engages the stop pin 88, and swings this lever about its pivot. This movement of the lever 86ᵃ swings the yoke 73 to the vertical position shown in Figs. 1 and 4 and causes the cam plate 75 to engage and depress the stem 63 of the plunger 62 against the action of the spring 65. As the stem 63 descends, it returns the head 62 to operating position and establishes communication between the chamber 55 and the outer atmosphere through the groove 68.

A device 122 may be provided, if desired, to spray water over the mold to cool the same when necessary.

While I have described a unit capable of producing a single article at each cycle of operation, it will be understood that the invention is adaptable to a machine embodying a series of these units mounted either in a row or on an intermittently or continuously rotating table or turret and supplied with mold charges from a single glass feeding device. Also, it will be apparent to those skilled in the art that the different mechanisms which I have disclosed as being manually operated may be actuated automatically, if desired.

The possible combinations of reheating, both in amount and location, necking-in, and the application of the preliminary blowing pressure to the parison insures a control of the glass distribution that gives any desired relation between the thickness of the glass walls in the various parts of the finished ware. At no time in the process is a parison out of adjustable control, as is the case in prior machines embodying an inverting neck ring or spindle. A mold charge may be dropped directly into the blank mold without contact with any deflector, trough, loading block or any surface that may chill or mark the surface of the mold charge. After the mold charge settles into contact with the walls of the parison mold, the surface of the parison is not again disturbed until the parison shaping operation is complete.

It will be understood that the sequence and duration of the several operations mentioned above may be altered as desired, according to the particular type of ware being produced, the nature of the glass, and the amount of initial heat retained therein after the pressing operation is concluded. For example, it may be found desirable, in some instances, to commence the necking operation at the same time that heat is first applied to the parison, and also with some types of ware, the blowing operation may begin at the commencement of the reheating operation. Also, in some instances the necking-in operation may be inaugurated prior to the application of blowing pressure and continued during the reheating period. Furthermore, the spinning of the parison may continue uninterruptedly from the time that the blank mold is removed to the time that the parison is blown to final form, as shown in Fig. 8.

During these operations of distending the blank or parison it is suspended from the neck ring or holder 13 (Figs. 6 and 7).

The nozzles 100 and 101 or their equivalents are capable of exercising two functions in the formation of the blank, namely, a heating function to facilitate distension of the blank, and a supporting or distension opposing function. These functions may be exercised either independently or in coordination, according to the varying conditions of the glass and the form or other characteristics of the ware to be produced.

The object of the heating function is to soften the glass to the required extent and at the required portions thereof, so that the expanding blank will be distended at the desired rate and at the portions thereof necessary to impart to the blank the desired contour and thickness of the wall, both of which vary for different kinds of patterns of ware and for different portions of the same piece of ware.

The object of the supporting function is to support the distending blank locally at selected portions thereof, so as to oppose undue elongation or expansion of the blank in any direction, which, as in the example illustrated herein, is most likely to occur in a downward direction, due to the weight of the glass. This supporting action is best illustrated in Fig. 6, in which the glass is supported from beneath by fluid pressure, mainly from the nozzle 101, so as to temporarily oppose downward elongation of the blank, while it is being distended laterally to the desired extent. If at this time the bottom portion of the blank is too thick, the heat from the appropriate nozzle, in this instance the nozzle 101, may be intensified by regulation of the fuel mixture in the ordinary way by well-known mixing valves in the supply pipes 99 and 102, shown conventionally in Fig. 6. On the other hand, if the bottom portion of the blank is already sufficiently thin, the gas constituent of the fuel mixture may be reduced, or may be shut off altogether, so that the supporting pressure acting on the glass through the appropriate nozzle or nozzles is mainly or wholly effected by the force of air. The intensity of the heat as well as the supporting force applied to the blank, whether of a burning or non-burning mixture, or of air alone, may be regulated by adjusting the mixing valves referred to.

The term "permanently disposed vertical axis" as used in certain of the claims in describing the position of the combined pressing and blowing plunger and/or the neck ring is intended to define these parts as being non-invertible and is not to be read as excluding a structure in which these parts may be mounted on a rotatable table or turret, so that they may be revolved about the central column of the machine, as well as rotated about their own vertical axes.

While there is disclosed in this application a mechanism in which complementary neck mold sections are mounted upon a support and are adapted to be moved toward their closed position by the upward movement of a mold, which in this instance is the blank mold, this subject matter is reserved for and claimed in my copending application 320,109 filed November 17, 1928, which is a continuation of this application as to this and other common subject matter.

It should be noted that my invention is not restricted in any way to the precise construction herein shown and described, and that my invention may be carried out in any manner and with any means within the scope of the appended claims.

I claim:

1. Apparatus for making hollow glassware, comprising a parison support permanently positioned at a combined pressing and blowing station, a mold mounted for movement into and out of cooperative relation to said support, means for forming a parison in said mold, means for directing a flame under pressure against said parison, and means for effecting relative rotation between said parison and said flame.

2. Apparatus for making hollow glassware, comprising a permanently upright parison support, a blank mold and a blow mold mounted for movement independently of each other into and out of cooperative relation to said support, means for applying a flame to said parison while suspended from said support, and means for rotating said parison relative to said flame.

3. Apparatus for making hollow glassware, comprising a parison support mounted to rotate upon a permanently vertical axis, means for rotating said support, means for reheating a parison carried by said support, and means for applying blowing pressure to said parison during the reheating operation.

4. Apparatus for making hollow glassware, comprising a parison support mounted to rotate on a permanently vertical axis, means for rotating said support, means for reheating a parison carried by said support, means for applying blowing pressure to said parison during the reheating operation, and means for necking-in said parison during the blowing and reheating operations.

5. Apparatus for making hollow glassware, comprising a parison support mounted to rotate on a permanently vertical axis, means for rotating said support, means for applying blowing pressure to a parison carried by said support during the rotation thereof, and means for projecting a flame under pressure against said parison to control the shape thereof during the blowing operation.

6. Apparatus for making hollow glassware, comprising a parison support mounted to rotate on a permanently vertical axis, means for rotating said support, means for applying blowing pressure to a parison carried by said support during the rotation thereof, and means for projecting a flame under pressure against said parison and at an angle to its axis of rotation to control the configuration of said parison during the blowing operation.

7. Apparatus for making hollow glassware, comprising a parison support mounted to rotate on a permanently vertical axis, means for rotating said support, means for applying blowing pressure to a parison carried by said support during the rotation thereof, and means for projecting a flame under pressure against the lower portion of said parison to retard the elongation thereof during the blowing of said parison and to thereby increase its radial distention.

8. Apparatus for making hollow glassware, comprising a neck ring mounted for rotation on a permanently vertical axis, a mold cooperating with said neck ring, means for shaping the glass articles in said mold, means for projecting a gaseous medium against the glass to impart a further shape to the glass exteriorly of said mold, and means for rotating said neck ring about said axis during both of said shaping operations.

9. Apparatus for making hollow glassware, comprising a neck ring mounted to rotate upon a permanently vertical axis, means for rotating said neck ring, means for reheating a parison supported by said neck ring, and means for applying blowing pressure to said parison during the rotating and reheating operations.

10. Apparatus for making hollow glassware, comprising a neck ring mounted to rotate on a permanently vertical axis, means for rotating said neck ring, means for reheating a parison supported by said neck ring, means for applying blowing pressure to said parison, and means for necking-in said parison during the rotating and blowing operations.

11. Apparatus for making hollow glassware, comprising a neck ring mounted to rotate on a permanently vertical axis, means for rotating said neck ring, means for applying blowing pressure to a parison supported by said neck ring, and means for projecting a flame under pressure against said parison to control the shape thereof during its formation stages.

12. Apparatus for making hollow glassware, comprising a neck ring mounted to rotate on a permanently vertical axis, means for rotating said neck ring, means for applying blowing pressure to a parison supported by said neck ring, and means for projecting a flame under pressure against said parison and at an angle to its axis of rotation to control the configuration of said parison during the formation stages thereof.

13. Apparatus for making hollow glassware, comprising a neck ring mounted to rotate on a permanently vertical axis, means for rotating said neck ring, means for applying blowing pressure to a parison supported by said neck ring, and means for projecting a flame under pressure against the lower portion of said parison to retard the sagging thereof during the formation stages of said parison.

14. Apparatus for making hollow glassware, comprising a neck ring, a blank mold mounted for movement into and out of cooperative relation to said neck ring, a plunger for pressing a charge of glass in said blank mold and neck ring, means for applying blowing air through said plunger, means for rotating said neck ring and blank, means for reheating said blank, means for necking-in said blank, and a blow mold adapted to be closed about said blank while suspended from said neck ring.

15. Apparatus for making hollow glassware, comprising a rotatable neck ring, a parison mold mounted for movement into and out of cooperative relation therewith, means for pressing a mold charge in said mold and neck ring, means for rotating said neck ring and parison subsequently to the removal of the parison mold, means for reheating said parison during the rotation thereof, a blow mold mounted for movement into and out of cooperative relation to said neck ring, and means for blowing said parison to final form in said blow mold.

16. Apparatus for making hollow glassware, comprising a neck ring, a parison mold mounted for movement into and out of cooperative relation therewith, means for forming a parison in said mold, and means actuated by the movement of said mold out of cooperative relation with said neck ring for applying blowing pressure to the parison.

17. Apparatus for making hollow glassware, comprising a neck ring, a parison mold mounted for movement into and out of cooperative relation therewith, a plunger mounted for movement into and out of cooperative relation to said neck ring and parison mold for pressing a mold charge therein, means actuated by the movement of said parison mold out of cooperative relation to said neck ring for applying blowing pressure through said plunger, and means actuated by the movement of said plunger out of cooperative relation to said neck ring for discontinuing the application of said blowing pressure.

18. Apparatus for making hollow glassware, comprising a neck ring, a parison mold cooperating therewith, a plunger mounted to rotate on a permanently vertical axis for pressing a mold charge in said mold, said plunger embodying a centrally disposed pressing head and an outer member adapted to yield in the event that an oversize charge is introduced into said mold.

19. Apparatus for making hollow glassware, comprising a parison mold; a pressing and blowing plunger mounted to rotate on a permanently vertical axis for forming a parison in said mold, said plunger embodying a tubular member having an air passage therein, and a central member adapted to close said air passages when in pressing position; and means for elevating said central member at the conclusion of the pressing operation to open said passage and admit blowing air to said parison.

20. Apparatus for making hollow glassware comprising a parison mold, a pressing and blowing plunger mounted to rotate on a permanently vertical axis for forming a parison in said mold, said plunger embodying a tubular member having air passages therein, a central member adapted to close said air passages when in pressing position, and an outer annular member adapted to yield in the event that an over-size mold charge is introduced into said mold, and means for elevating said central member at the conclusion of the pressing operation to open said passages and admit blowing air to said parison.

21. Apparatus for working hollow glassware, comprising a permanently vertical combined pressing and blowing head, a blank mold and blow mold arranged for alternate cooperation with said head, and means for rotating said head.

22. The method of making hollow glassware, which consists in forming a parison, suspending the parison, simultaneously rotating, heating and partially blowing said parison, necking-in the parison and blowing it to final form.

23. The method of making hollow glassware, which consists in forming a parison, suspending said parison from its upper portion, rotating said parison and allowing it to sag, and applying a flame under pressure against the lower portion of the parison to retard said sagging.

24. The method of making hollow glassware, which comprises forming a parison, suspending said parison from its upper portion, rotating said parison and allowing it to sag, applying blowing pressure to said parison during its rotation, and simultaneously applying a flame under pressure against said parison and at an angle to the axis thereof, to control the rate and location of the lateral distention of said parison caused by said blowing pressure.

25. The method of making hollow glassware, that comprises depositing a mold charge of molten glass in a blank mold, pressing a blank in said mold, removing said mold while suspending said blank from its upper portion, heating said blank from below, partially expanding said blank, and subsequently enclosing it in a blow mold and expanding said blank to final form therein.

26. The method of making hollow glassware, that comprises depositing a mold charge of molten glass in a blank mold, pressing a blank in said mold, removing said mold while suspending said blank from its upper portion, rotating said blank, heating said blank from below, partially expanding said blank, enclosing said blank in a blow mold, and expanding said blank to final form therein.

27. The method of making hollow glassware, which comprises suspending a mass of glass, expanding said glass by fluid pressure applied interiorly thereof, and controlling the distribution of said glass by fluid pressure applied exteriorly thereof.

28. The method of making hollow glassware, which comprises suspending a mass of glass and allowing it to sag under the action of gravity, applying blowing pressure to said glass, and controlling the distension of the glass by a flame directed against the outer surface thereof.

29. The method of making hollow glassware, which comprises suspending a mass of glass and allowing it to sag under the action of gravity, applying blowing pressure to said glass, directing a fluid-pressure stream against said glass and causing relative rotative movement between the glass and said fluid-pressure stream to apply said stream uniformly to all sides of the glass, and thereby to control the configuration thereof.

30. Apparatus for shaping hollow glassware, comprising a support for a mass of glass, means for blowing said glass, means for directing fluid-pressure against said glass to control the configuration thereof during the blowing operation, and means for causing relative rotative movement between said support and said fluid-pressure means to produce the desired configuration.

31. Apparatus for shaping hollow glassware, comprising means for supporting a suspended mass of glass, means for directing fluid under pressure upwardly against said glass to control the elongation thereof under the action of gravity, and means for rotating one of said means relative to the other.

32. Apparatus for shaping hollow glassware, comprising means for supporting a suspended mass of glass, means for applying blowing pressure to said glass, a burner for directing a flame against said glass during the blowing operation to control the configuration and distribution thereof, and means for effecting relative rotative movement between said support and said burner to apply said flame uniformly circumferentially of said glass.

33. Apparatus for shaping hollow glassware comprising a neck ring having a permanently disposed vertical axis, a blank mold mounted for movement about a horizontal axis into and out of cooperative relation with said neck ring, a blow mold mounted for movement about a vertical axis into and out of cooperative relation with said neck ring, and a combined pressing plunger and blow head for pressing a blank in said blank mold and for blowing the blank to final form in said blow mold.

34. Apparatus for shaping hollow glassware, comprising a neck ring having a permanently disposed vertical axis, a blank mold and a blow mold associated therewith, means for raising and lowering said blank mold into and out of cooperative position relative to said neck ring, means for forming a blank in said blank mold, means for moving said blow mold laterally into and out of cooperative position relative to said neck ring, and means for blowing said blank to final form in said blow mold.

35. Apparatus for shaping hollow glassware, comprising a neck ring having a permanently disposed vertical axis, a blank mold and a blow mold associated therewith, means for moving said blank mold vertically into and out of cooperative position relative to said neck ring, means for forming a blank in said blank mold, means for swinging said blow mold laterally into and out of cooperative position relative to said neck ring, and means for blowing said blank to final form in said blow mold.

36. Apparatus for shaping hollow glassware, comprising a neck ring having a permanently disposed vertical axis, a blank mold and a blow mold associated therewith, means for moving said blank mold vertically into and out of operative position relative to said neck ring, means for forming a blank in said blank mold, means for swinging said blow mold laterally into and out of axial alignment with said neck ring, and means for blowing said blank to final form in said blow mold.

37. The method of forming a glass parison, which comprises forming the neck portion of a parison in a neck mold, suspending the parison by the neck mold and applying fluid pressure other than atmospheric pressure internally and externally of the parison to impart a preliminary configuration thereto.

38. The method of forming a glass parison, which comprises forming the neck portion of the parison in a neck mold, suspending the parison by the neck mold, applying fluid pressure other than atmospheric pressure internally and externally of the parison to expand and shape the same, and causing relative movement between the said parison and the source of said external pressure.

39. The method of forming a glass parison, which comprises forming the neck portion of the parison in a neck mold, suspending the parison by the neck mold, applying fluid pressure other than atmospheric pressure internally and externally of the parison to expand the same, and rotating said parison during application of said pressures.

40. The method of forming a glass parison, which comprises forming the neck portion of the parison in a neck mold, suspending the parison by the neck mold, applying fluid pressure greater than atmospheric pressure internally and externally of the parison to expand the same, rotating said parison during application of said pressures, and necking in said parison during the rotation thereof.

41. The method of forming a glass parison which comprises forming the neck portion of the parison in a neck mold, suspending the parison by the neck mold, applying blowing pressure to the interior of said parison and simultaneously directing a flame under pressure against the exterior surface thereof to reheat the same and to modify the configuration imparted thereto by said blowing pressure.

42. The method of forming a glass parison which comprises forming the neck portion of the parison in a neck mold, suspending the parison by the neck mold, applying blowing pressure to the interior of said parison and simultaneously directing a flame under pressure against the exterior surface thereof to reheat the same and to modify the configuration imparted thereto by said blowing pressure, and thereafter enclosing the partially blown parison in a blow mold and blowing it to final form therein.

Signed at Hartford, Connecticut, this 16th day of May, 1925.

ROBERT W. CANFIELD.